June 6, 1961 R. GERBER 2,986,950
PRESELECTOR FOR MULTIPLE-SPEED TRANSMISSION
Filed Nov. 18, 1957 5 Sheets-Sheet 1

INVENTOR
ROGER GERBER
BY
ATTORNEYS

June 6, 1961 R. GERBER 2,986,950
PRESELECTOR FOR MULTIPLE-SPEED TRANSMISSION
Filed Nov. 18, 1957 5 Sheets-Sheet 3

Fig. 3.

INVENTOR
ROGER GERBER
BY
Mitchell & Bechert
ATTORNEYS

United States Patent Office 2,986,950
Patented June 6, 1961

2,986,950
PRESELECTOR FOR MULTIPLE-SPEED
TRANSMISSION
Roger Gerber, Kensington, Conn., assignor to The New
Britain Machine Company, New Britain, Conn., a corporation of Connecticut
Filed Nov. 18, 1957, Ser. No. 697,148
17 Claims. (Cl. 74—335)

This invention relates to a multiple-speed transmission and has particular application to the driving of lathe spindles.

It is an object of the invention to provide an improved means of the character indicated.

Another object of the invention is to provide a spindle drive having a wide range of spindle speeds.

A further object is to meet the above objects with a device providing a single selector for rapidly establishing any one spindle speed within the speed range.

It is also an object to provide an improved gear-shifting system in which a single actuator simultaneously shifts a plurality of related gears in a preselected combination to provide the selected speed.

Still another object is to provide combination speed-preselector and gear-shifting mechanism which automatically disconnects the spindle from the gear train when the shifting mechanism is in speed-selecting position, and locks the preselector in speed-selected position when the gears are shifted to speed-selected position.

Other objects and various further features of novelty and invention will be pointed out or will occur to those skilled in the art from a reading of the following specification in conjunction with the accompanying drawings. In said drawings, which show, for illustrative purposes only, a preferred form of the invention:

FIG. 6 is a developed view of the gear-shifting cam in the mechanism of FIG. 2;

Briefly stated, the invention contemplates an improved multiple-speed gear transmission featuring simple actuating and preselector means and yet permitting the selection of any one from a very large number of possible transmission ratios. The basic selection and gear-shifting mechanism contemplates application to meshing gears on spaced parallel axes, said gears including an axially shiftable member determining a plurality of speed relations of said axes for different axial positions of the shiftable member; a rocker arm is adapted to shift said member. The preselector comprises a novel indexible head which supports a plurality of actuating pins of various projecting lengths for variously actuating the rocker arm; the indexible head is reciprocable toward and away from the rocker arm in order to actuate the same for a given selected indexed position, and thus for a given selected transmission-speed ratio.

In the form to be described, the transmission includes several sets of meshing gears on a plurality of spaced axes, and for each set of meshing gears there is a shifting member and associated rocker arm. Nevertheless, the same selector head carries all the pins necessary to actuate all the rocker arms for all the available indexed positions of the head. Thus, with the single selector head, the number of available speed ratios is a direct function of the number of different speeds available for all sets of meshing gears, times the number of sets of meshing gears. In the specific form shown, there are four shafts in the gear train and three sets of meshing gears, and for each set of meshing gears there are three possible speed selections.[1] The total number of available speed ratios is therefore $3^3$, or 27.

Figure 1:
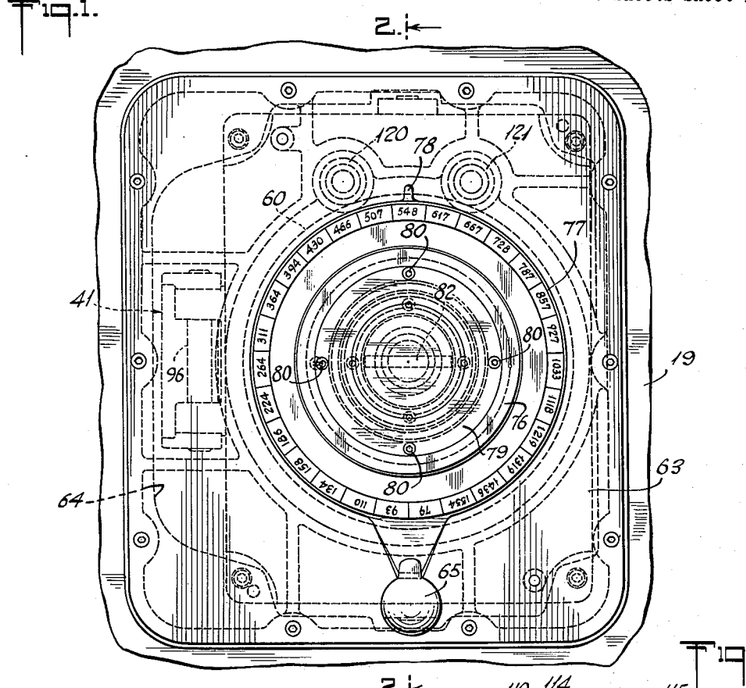
FIG. 1 is a front view of the preselector dial and actuating means for gear-shifting mechanism incorporating features of the invention.
Figures 2, 5:
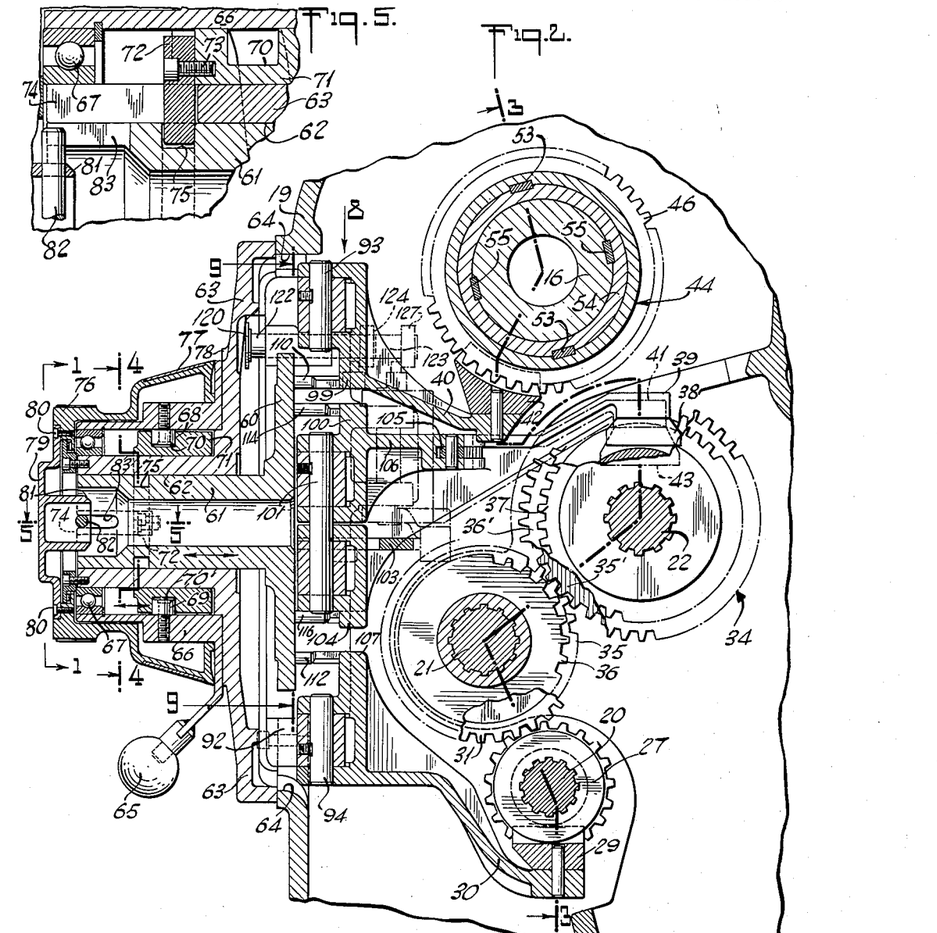
FIG. 2 is a section taken on line 2—2 of FIG. 1, showing gears and levers of the shifting mechanism, as well as a machine spindle driven thereby.
FIG. 5 is an enlarged fragmentary sectional view in the plane 5—5 of FIG. 2.
Figure 3:
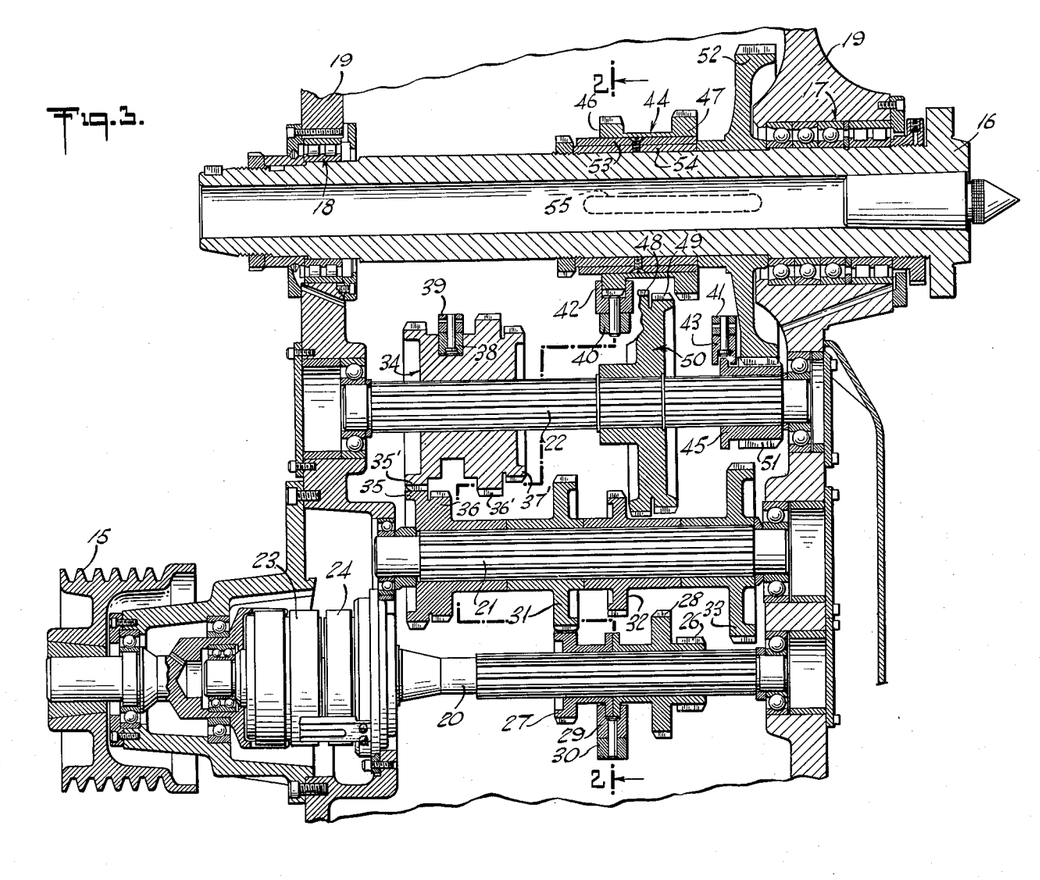
FIG. 3 is a section developed substantially on line 3—3 of FIG. 2, showing the various gear clusters in the shifting mechanism.

Referring to FIGS. 1, 2, and 3 of the drawings, the invention is shown in application to a speed-selecting and gear-shifting mechanism having manually operable means (FIG. 1, and left side of FIG. 2) for determining the speed relation between a drive pulley 15 (FIG. 3) and a lathe spindle 16. The spindle 16 is shown revolubly supported in spaced bearings 17—18 in frame means 19, and the train of transmission involves a first or drive shaft 20 and two intermediate shafts 21—22. A clutch 23 is shown for selectively connecting the drive means 15 to the shaft 20, and brake means 24 is shown for arresting spindle rotation in order to speed up a given gear-shifting cycling of the machine.

Figure 8:
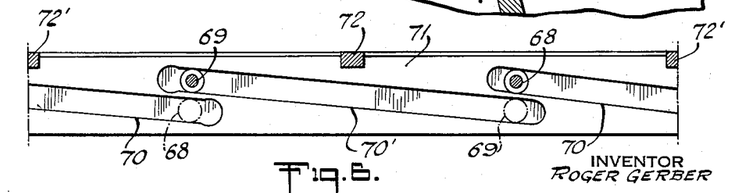
FIG. 8 is a top view of the shifting mechanism of FIG. 2, looking in the direction of arrow 8 of FIG. 2, and showing the shifting levers in the position which corresponds to the position of the shiftable gear clusters of FIG. 3.
Figures 9, 10, 11, 13:
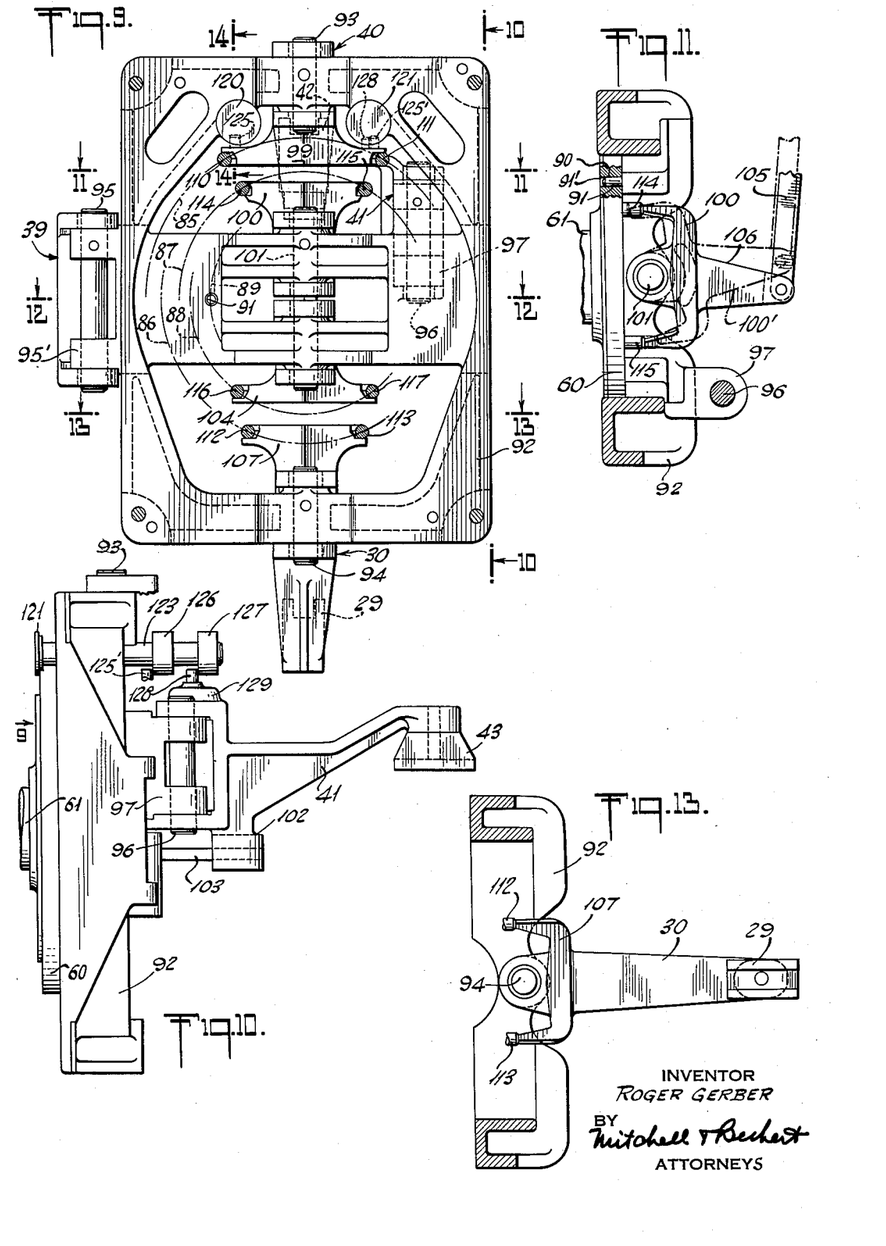
FIG. 9 is a view of the assembly of FIG. 8, looking in the direction of arrows 9 of FIGS. 2, 8 and 10.
FIG. 10 is a side view looking in the direction of arrows 10 of FIG. 9, but showing only the near gear-shifting lever, namely the gear-shifting lever which cannot appear in the section of FIG. 2.
FIG. 11 is a sectional view taken on line 11—11 of FIG. 9.
FIG. 13 is a sectional view taken on line 13—13 of FIG. 9.

The drive shaft 20 is splined and slidably supports a first gear cluster comprising a low-speed drive gear 26, an intermediate-speed drive gear 27, and a high-speed drive gear 28. Shifting means comprising a shoe 29 pivoted to the end of an actuating arm or crank 30 (see also FIGS. 8 and 13) determines the longitudinal placement of the gear cluster 26—27—28, for engagement with one of the axially fixed gears 31—32—33 on shaft 21, depending upon the axial displacement of the cluster 26—27—28, thereby selecting a given speed relation between shafts 20—21. In FIG. 3, the gear 27 happens to engage the fixed gear 31 on shaft 21, representing the

[1] One of these sets happens to utilize two separately shiftable gear clusters on two shafts, but it is referred to as one set because only one or the other of these clusters is engaged at any one time.

intermediate shifted position of the cluster 26—27—28. For a shift of said cluster to the left, the high-speed gear 28 meshes with the gear 32 on shaft 21, and for a shift of said cluster to the right, the low-speed gear 26 is meshed with the gear 33 on shaft 21.

In similar manner, the intermediate shaft 21 drives the second intermediate shaft 22 in accordance with the particular speed selected by axial placement of a second gear cluster 34, slidable along splines of shaft 22. For the intermediate position shown, an intermediate-speed relation between shafts 21—22 is determined, by meshing gears at 35—35′. For a shift of cluster 34 to the left, the low-speed gears 36—36′ are engaged, and for a shift of cluster 34 to the right, the high-speed gears 31—37′ are engaged. The shifting mechanism for gear cluster 34 on shaft 22 is shown to include a shoe 38 at the end of an actuating arm 39 (see also FIGS. 2 and 8).

Because it is desired that under certain conditions (to be described) the intermediate shaft 22 shall be disengaged from the lathe spindle 16, I provide a gear-selection connection between these members such that for one longitudinal position of a shiftable member, shaft 22 shall be disengaged from spindle 16. In the form shown, this entails the employment of two shifting arms 40—41 carrying shoes 42—43 which engage parts of axially slidable gear-shift members 44—45 (see also Figs. 2, 8, 10, 12). Member 44 is a two-gear cluster, and is shown in the intermediate position in which each of the gears 46—47 thereof straddles the gears 48—49 of a corresponding cluster 50, longitudinally fixed to the second intermediate shaft 22; thus, for the position shown, the cluster 44 establishes no engagement between the shaft 22 and the spindle 16. On the other hand, for the position shown for shiftable member 45, a geared engagement is established between a slow-speed gear 51 and the corresponding gear 52 on the spindle. When lever 43 is shifted to the left, (in the sense of FIG. 3) gears 51—52 are removed from engagement, and the spindle 16 is entirely free from the second intermediate drive shaft 22.

The cluster 44 is shown to be slidable on sleeve means 54, and the keyed relation between gear cluster 44 and spindle 16, and between gear 52 and spindle 16, is suggested at 53 and by the elongated dashed line 55.

Figure 4:
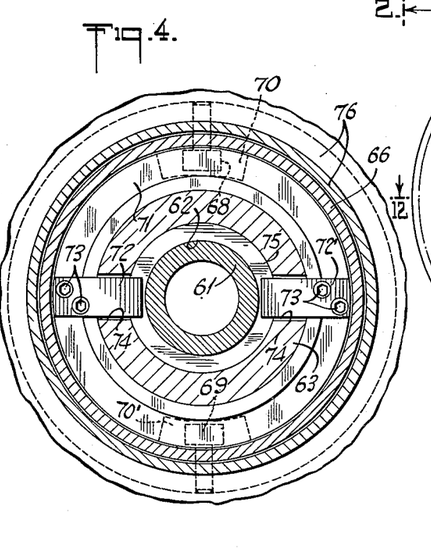
FIG. 4 is an enlarged sectional view taken substantially on line 4—4 of FIG. 2.

As indicated generally above, the gear-selection mechanism and the means for shifting gears into a selected ratio depend upon a novel mechanism involving, for each shifter, a rocker arm positioned by pins striking the respective ends of the rocker arm, as the gear-shifting mechanism is advanced toward the rocker arms. In the present embodiment, all pins determining the position of rocker arms for each of the shifters 29—39—40—41 are carried by a single preselector plate or disc 60 having a hub 61 slidably guided in a bore 62 for longitudinal reciprocation (see FIGS. 2 and 4). The bore 62 is part of a frame member 63 secured at an opening 64 in the frame means 19, and the means whereby the preselector plate 60 is longitudinally reciprocated is under the control of an actuating arm or crank 65, accessible for manual operation. As shown in FIG. 2, said arm 65 is in a down or actuated position, meaning that the selector plate 60 has been fully advanced into gear-shifting relation with the shifters identified above.

The actuator 65 is shown to be formed with a hub 66 supported by antifriction bearing means 67 on the frame part or base 63, and cam means is employed to convert rotary actuation of arm 65 into reciprocating longitudinal movement of the selector disc 60. In the form shown, cam-follower rolls 68—69 are carried in the bore of the hub 66 and continuously ride the cam or cams 70—70′ formed in a sleeve member 71. From FIG. 6 it will be seen that the cams 70—70′ in sleeve member 71 correspond exactly and are 180°-displaced from each other. Key members or lugs 72—72′ (FIGS. 4 and 5) may be secured by means 73 to the sleeve 71 and project radially inwardly through diametrically opposed elongated slots 74, serving to hold sleeve 71 against rotation, but nevertheless providing a means whereby the hub 61 of the selector disc 90 may be longitudinally advanced. In the form shown, the radially inner ends of lugs 72—72′ ride a circumferential groove 75 in the tail end of hub 61. Thus, whatever the selected angular position of preselector disc 60 (with hub 61), actuation of crank 65 will impart purely longitudinal displacement to disc 60.

As indicated, the preselector disc 60 is not only longitudinally reciprocable, but is indexible about its axis in order to permit preselection of the speed relationship desired. Indexing can take place only when the actuator 65 has retracted sufficiently from engagement with the shifting mechanism (to be described). For the relation of FIG. 2, therefore, the actuator 65 will have to be cranked upwardly (counterclockwise one-half revolution, as viewed from the aspect 1—1 of FIG. 2). Such actuation frees the selector disc 60 and its hub 61 for rotation, and in the form shown, a selector knob 76 is grasped and rotated until the desired angular setting is achieved corresponding to the desired feed selection. The angular setting may be read off a frustoconical scale 77 (on knob 76) against an indicating device, nib or pointer 78 on the frame member 63.

In the form shown, the selector knob is of two-part construction involving a removable center disc or connector 79 secured to the knob part 76, as by means 80. The connector part 79 includes an inwardly projecting hub 81 supporting a transverse pin 82, constantly engageable with opposed elongated slots 83 at the axially outer end of the preselector hub 61. It will be appreciated that when the actuator 65 has reciprocated the hub 61 to its fully withdrawn or retracted position, it may be received in the shallow hollowed annular interior of the connector member 79. Thus, no external parts of the mechanism are longitudinally reciprocated during an actuation of the member 65.

Figure 7:
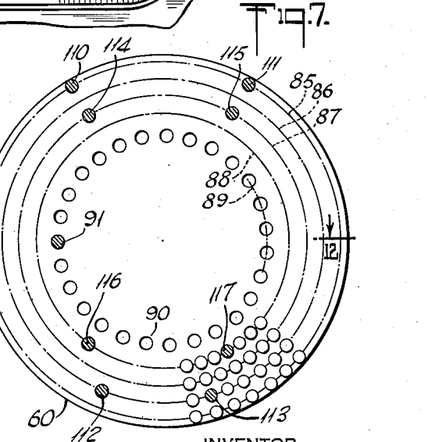
FIG. 7 is a rear view of the preselector disc in the mechanism of FIG. 2, the parts being displayed as from the aspect 7—7 in FIG. 8.

In FIG. 7, the shifter pins carried by the selector plate 60 are shown disposed on concentric circles, suggested by phantom lines 85—86—87—88—89. Holes 90 on the inner of these circles 89 are used for locating an indexed position, once selected, and for assuring that the shifting mechanism shall not be actuated unless selection has been made cleanly to one of the available speed relationships. To achieve location, a single pin 91 (see FIGS. 7, 9, and 12) is shown carried by a fixed member or bracket 92 and projects into intercepting relation with one of the holes 90 in the selector plate 60, as the latter is advanced into a shifting position (i.e. to the right, in the sense of FIGS. 2 and 12). If the selector plate 60 has been indexed substantially correctly, the chamfered end 91′ of the pin 91 will assure precise alignment with the selected locating hole 90, and it can be known that, for each of the remaining concentric circles 85—86—87—88, shift pins of various height are properly set to determine the selected speed-shifting relationships, all as will be described more fully.

All of the levers or arms 30—39—40—41 used for shifting various gears or gear clusters in the transmission are shown pivotally mounted on the bracket 92. The upper and lower shifter arms 40—30 are separately pivoted on pins 93—94, respectively, on a centrally located vertically extending axis. The shifter arm 39 is separately pivoted at 95 on a lug 95′ formed as a part of the bracket 92, and the shifter arm 41 is pivoted at 96 (see FIGS. 8-9-10-11-12) on another lug 97 formed as a part of the bracket 92.

As indicated generally above, there is provided for each of the shifter arms 30—39—40—41, an individual rocker arm to actuate the same. All four rocker arms are mounted on the same central vertical axis as that accommodating pins 93—94. The first or upper rocker arm 99 accommodates the upper shift arm 40 by means of direct connection thereto, or integral formation therewith (see FIGS. 2 and 9). The second rocker arm 100 is pivoted on a central shaft 101 (carried by bracket 92) and actuates the shift arm 39 by means of a link engagement 105 with the crank 106 of rocker arm 100 (see FIGS. 8 and 11). A third rocker arm 104 (pivoted on shaft 101) accommodates the shift arm 41 through a similar link connection 103 to the crank arm 102 of shift arm 41 (see FIGS. 8 and 12). The fourth and final rocker arm 107 accommodates the lower shift lever 30 by direct connection thereto, or integral formation therewith, in a manner analogous to that employed at 99—40 for the upper shift lever.

Each of the rocker arms is provided with spaced feet disposed to intercept two spaced shift pins, for any particular indexed position of the preselector plate 60, and the pins serving any one rocker arm are disposed on one of the four concentric circles of pins 85—86—87—88. In the form shown, the upper rocker arm 99 has spaced feet engaging pins 110—111 on the outer concentric circle 85. (For convenience in identifying the parts in the drawings, these particular pins in the outer concentric circle are shown shaded in Fig. 7 and are correspondingly shaded in FIG. 9, to identify the number of pins utilized in any single speed selection.) In similar manner, spaced pins 112—113 on the next inner concentric circle 86 engage the feet of lower rocker arm 107 for the same selected position of the disc 60. Pins 114—115 on the next concentric circle 87 engage the feet of rocker arm 100, and pins 116—117 on the inner concentric circle 88 engage the feet of the rocker arm 104.

As indicated above, most of the gear clusters shifted by the described mechanism are to be positioned in one of three possible longitudinal locations by means of the shift levers and rocker arms. With the actuators of the invention, this means the employment of one of three pin-length relationships for each of the pin positions on the four concentric circles 85—86—87; pin-length relationships on circle 88 are one of two since gear 51 (controlled by pins on circle 88) has only two positions, viz. engaged with or disengaged from gear 52.

To determine an intermediate position of one of the clusters, say the cluster 34 on the shaft 22, the shifter 39 must be actuated to an intermediate position. This means that when the selector plate 60 is advanced in the gear-shifting direction (to the right in the sense of FIG. 2, by cranking actuator 65 clockwise to the down position shown in FIG. 2), pins 114—115 of intermediate (and, preferably, the same) length must engage the feet or opposite ends of the rocker arm 100 (see FIG. 11). To determine a shifted position to one side of the intermediate position, a short pin may be employed at 114, and a long pin at 115, thus determining that the rocker arm 39 is actuated into an extreme position, as suggested at 100' in FIG. 11, when the selector plate 60 is set.

Figures 8, 12, 14:
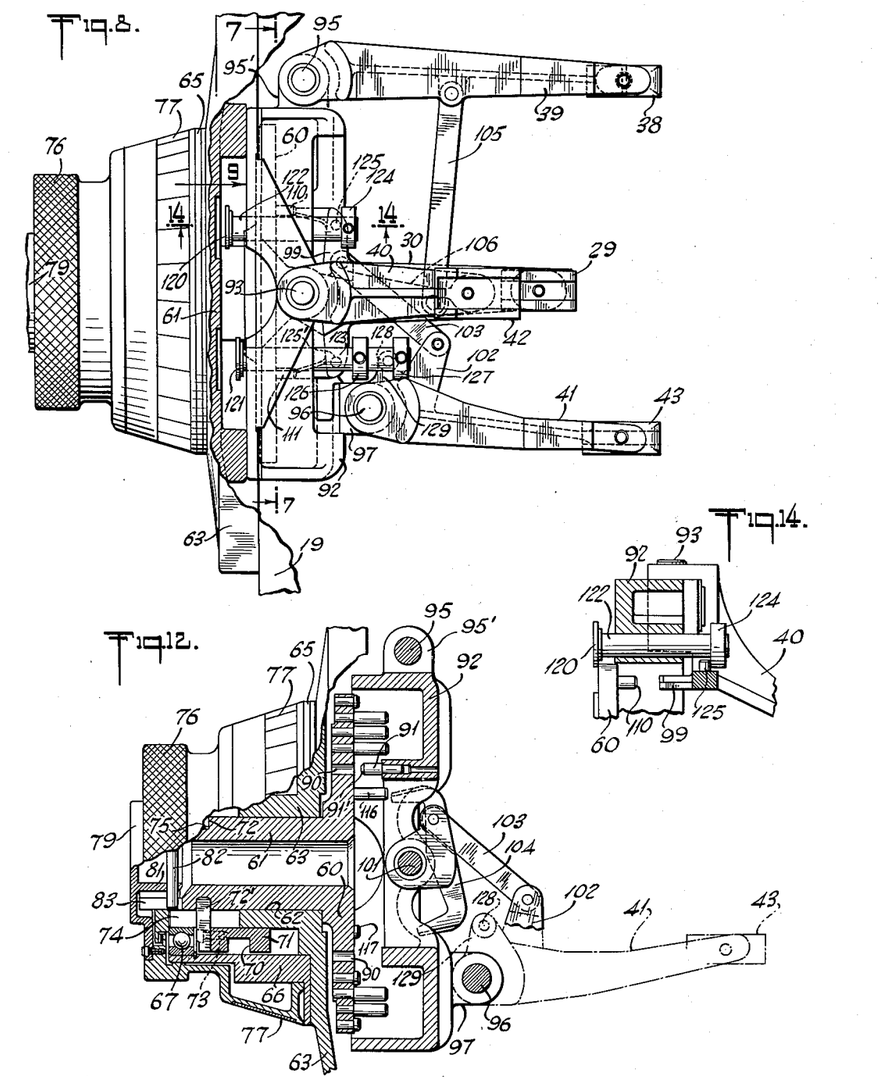
FIG. 12 is a sectional view taken on the line 12—12 of FIGS. 7 and 9 and shows the preselector disc in retracted or speed-preselecting position.
FIG. 14 is a fragmentary view taken substantially on line 14—14 of FIG. 9, for the condition in which the preselector disc has been retracted.

FIG. 12 illustrates a similar situation for rocker arm 104, governing the shift arm 41 for gear hub 45, and it so happens that in FIG. 12 rocker arm 104 is shown canted away from the engaged position and poised to be actuated by pin 116 into its opposite extreme canted position when the selector plate 60 is fully advanced; this will mean shifting the gear hub 45 to its other extreme longitudinal position (i.e. into engagement with gear 52). It will be noted by reference to FIG. 12 that, when the selector plate 60 is fully retracted, all pins, even the longest pin, are sufficiently retracted to clear the feet of all possibly canted rocker arms, thus permitting free twirling or indexing of the knob 76 to select any speed change. Once the selected position of dial 77 has been set, the actuator arm 65 may be cranked to propel all pins forward and to effect the newly selected shifted relation for all rocker arms and associated gear hubs or clusters.

It is highly convenient for an operator of the machine to be able to quickly disengage the drive from the spindle 16 to permit manual rotation of the spindle, as when orienting a chuck for easy insertion or removal of a workpiece. With my mechanism, this desirable result is effected automatically every time the selector mechanism is retracted. In the form shown (see FIGS. 8, 9, 10, 14), enlarged heads 120—121 on rods 122—123 (longitudinally slidable in the bracket 92) intercept the selector plate 60 during a retracting displacement thereof, so that complete retraction of the plate 60 will fully retract rods 122—123 if such retraction should be called for. On the other side of bracket 92, a collar 124 on rod 122 is poised to engage a pin 125 on the rocker arm 99 (for shift lever 40), and another collar 126 on the rod 123 engages another pin 125' on the opposite end of rocker arm 99; similarly, a further collar 127 on rod 123 is poised to intercept a pin 128 on an offset or arm 129 forming part of the shift lever 41. Thus, on retraction of the plate 60, both rods 122—123 will be pulled back upon interception by plate 60, and the resulting retraction of one or the other of rods 122—123 will be effective to return the shifters 40—41 to disengaged relation. When the plate 60 is fully retracted, both pins 125—125' of rocker arm 99 are engaged by their respective collars 124—126, and the pin 128 of integral crank arm 102 and shifter arm 41 is engaged by its coacting collar 127. This arrangement secures the gear cluster 44 and pinion gear 51 in neutral or disengaged position so that spindle 16 is free for manual rotation. This relation of parts is best shown in FIG. 14 for the case of engagement by rod 122 and collar 124 with the arm 40 at pin 125, and in FIG. 10 for the engagements of collars 126—127 with pins 125'—128, governing arms 40 and 41, respectively. In order that the shifter levers 40—41 may be actuated by their respective pins 125 or 125' and 128 and their coacting collars, the pairs of actuating pins on plate 60 must first be withdrawn clear of the ends of the feet of the rocker arms 99—104. To this end the leverage ratios are so arranged that the rear edge of plate 60 engages the enlarged heads 120—121 of pins 122—123 approximately after the initial half of the rearward travel of plate 60.

It will be appreciated that for each possible selected angular position of plate 60 (i.e. a selected one of 27 positions, in FIG. 7), different pairs of pins 110—111 (on circle 85) will be aligned for actuation of rocker arm 99, different pairs of pins 114—115 (on circle 87) will be aligned for actuation of rocker arm 100, different pairs of pins 116—117 (on circle 88) will be aligned for actuation of rocker arm 104, and different pairs of pins 112—113 (on circle 86) will be aligned for actuation of rocker arm 107. For those rocker arms (99—100—107) which must position a gear cluster in one of three positions, the effective pin-height relationships are one of three for any selected positions of disc 60; for example, in pin circle 87 pins 114—115 may be of equal height (FIG. 11), or pin 114 may be taller than pin 115, or pin 115 may be taller than pin 114, depending upon the desired gear-shift relation at a particular orientation of plate 60. For rocker arm 41, which must only position the hub 45 in one of two locations, only two pin-height relationships are needed in pin circle 88, one of these being shown at 116—117 in FIG. 12. Since arms 40—41 cooperate to determine speed relationships between shaft 22 and spindle 16 (and thus constitute, effectively, a single shifting means, determining three speed relationships), the disclosed device in reality involves three shift mechanisms, each determining three speed relations. The permutations and combinations of these shift mechanisms are 3×3×3, or 27, thus accounting for the 27 speeds available by positioning the preselector disc 60. Legends applied to the segments of dial 77 in FIG. 1 are suggestive of progressive spindle-speed changes for the same input speed, derived at pulley 15.

It will be seen that I have described an improved multiple speed transmission with readily manipulated means for not only selecting the desired speed ratio, but also for simultaneously shifting all gear clusters in the train, to establish the desired speed relation. Upon retraction of the selector plate 60, there is no loss of control of the selected speed ratio, but the spindle is disconnected to permit manual rotation thereof should that be desired; by thereafter cranking the actuator 65 to reengage the spindle, the same speed relation is preserved, and the net effect is merely to reengage the spindle. If, however, a different speed relation is desired, a simple rotary actuation of the selector dial (when the spindle is disconnected) is the only necessary change, because once the dial position has been selected, the same manual actuation at 65 achieves connection to the spindle at the desired new speed relation. The mechanism is fool-proof, and I have found the same to be trouble-free and completely non-fouling. It is no more difficult to change between the most extreme speed relations possible than it is to change between any two adjacent speed ratios. As long as any given speed ratio has been selected and engaged, it is impossible to attempt the selection of any other speed (without disengaging the spindle), and, if by any chance, there was an inadequately defined speed selection in the positioning of knob 76, the locating pin 91 will strike plate 60 and will not enter one of the holes 90, thus preventing attempted engagement of the gears; only when selection is close enough to the position at which the chamfered end 91' of pin 91 will enter one of the locating holes 90 can the gears be engaged.

While I have described the invention in detail for the preferred form illustrated, it will be understood that modification may be made within the scope of the invention as defined in the claims which follow.

I claim:

1. Gear-shifting mechanism, comprising, in combination, a frame, meshing gear means on two spaced parallel axes in said frame, said gear means including an axially shiftable member connected to the gear means on one of said axes and determining first and second speed relations between said gear means for two different axial positions of said member, a rocker arm pivotally mounted intermediate actuation ends thereof and adapted to shift said member upon rotation of said arm, an indexible head carried by said frame for indexing movement and supporting separate actuating pins for each end of said arm and for all of a plurality of indexed positions of said head, means for moving said head to advance into engagement with the ends of said arm the particular pins identified with the particular indexed position of said head, and locking means coacting between said head and said frame during an advancing movement of said head for locking said head against indexing movement while so engaged with said arm.

2. Gear-shifting mechanism, comprising, in combination, a frame, meshing gear means on two spaced parallel axes in said frame, said gear means including an axially shiftable member connected to the gear means on one of said axes and determining first and second speed relations between said gear means for two different axial positions of said member, a rocker arm pivotally mounted intermediate actuation ends thereof and adapted to shift said member upon rotation of said arm, a rotatably indexible head carried by said frame for indexing movement and supporting for all of a plurality of indexed positions thereof separate actuating pins for engagement with the respective ends of said arm, means for axially moving said head to advance into engagement with the ends of said arm the particular pins identified with the particular indexed position of said head, and locking means coacting between said head and said frame during an advancing movement of said head for locking said head against indexing movement while so engaged with said arm.

3. Gear-shifting mechanism comprising, in combination, a frame, a plurality of meshing gear means on a plurality of axes in said frame, said gear means including two independently axially shiftable members, each of which is separately connected to a gear means on a different axis and determines first and second speed relations for the two axes with which it is concerned, two separate rocker arms pivotally mounted intermediate actuation ends thereof and adapted respectively to shift said members upon rotation of said arms, an indexible head supporting for all of a plurality of indexed positions thereof separate pairs of actuating pins for the respective ends of each of said arms, means for moving said head to advance into engagement with the ends of said arm the particular pins identified with the particular indexed position of said head, and locking means coacting between said head and said frame during an advancing movement of said head for locking said head against indexing movement while so engaged with said arm.

4. Gear-shifting mechanism, comprising, in combination, a frame, meshing gear means on two spaced parallel axes in said frame, said gear means including an axially shiftable member connected to the gear means on one of said axes and determining an engaged relation of said gear means for one axial position of said member and a disengaged relation of said gear means for another axial position of said member, a rocker arm pivotally mounted intermediate actuation ends thereof and adapted to shift said member upon rotation of said arm, an indexible head carried by said frame for indexing movement and supporting separate actuating pins for each end of said arm and for all of a plurality of indexed positions of said head, and means for advancing into actuating engagement with the ends of said arm the particular pins identified with the particular indexed position of said head, said last-defined means including means for rocking said arm to disengage said gears upon retraction of said pins.

5. Gear-shifting mechanism, comprising, in combination, a frame, meshing gear means on two spaced parallel axes in said frame, said gear means including an axially shiftable member connected to the gear means on one of said axes and determining first, second and third engaged speed relations of said axes for three different axial positions of said member, a rocker arm pivotally mounted intermediate actuation ends thereof and adapted to shift said member upon rotation of said arm, an indexible head carried by said frame for indexing movement and supporting separate actuating pins for each end of said arm and for all of a plurality of indexed positions of said head, the height relation of predetermined ones of said pins being different for each of three indexed positions of said head, means for moving said head to advance into engagement with the ends of said arm the particular pins identified with the particular indexed position of said head, and locking means coacting between said head and said frame during an advancing movement of said head for locking said head against indexing movement while so engaged with said arm.

6. Gear-shifting mechanism, comprising, in combination, a frame, meshing gear means on two spaced parallel axes in said frame, said gear means including an axially shiftable member connected to the gear means on one of said axes and determining first and second engaged speed relations of said axes for a first two different axial positions of said member and a disengaged relation of said axes for a third axial position of said member, a rocker arm pivotally mounted intermediate actuation ends thereof and adapted to shift said member upon rotation of said arm, an indexible head carried by said frame for indexing movement and supporting separate actuating pins for each end of said arm and for each of a plurality of indexed positions of said head, the height relation of predetermined ones of said pins being different for each of three indexed positions of said head, means for moving said head to advance into engagement with the ends of said arm the particular pins identified with the particular indexed position of said head, and locking means coacting between said head and said frame during an advancing movement of said head for locking said head against indexing movement while so engaged with said arm.

7. Gear-shifting mechanism, comprising, in combination, a frame, meshing gear means on two spaced parallel axes in said frame, said gear means including an axially shiftable member connected to the gear means on one of said axes and determining an engaged relation between said gear means for a first axial position of said member and a disengaged relation of said gear means for a second axial position of said member, a rocker arm pivotally mounted intermediate actuation ends thereof and adapted to shift said member upon rotation of said arm, an indexible head carried by said frame for indexing movement and supporting separate actuating pins for each end of said arm, there being a separate pair of said pins for all of a plurality of indexed positions of said head, reciprocating means for advancing said head and therefore said pins into engagement with the ends of said arm when in a selected indexed position of said head, and means coacting with said reciprocating means during a retracting movement thereof for actuating said shiftable member into the position determining a disengaged relation between said gear means.

8. Mechanism according to claim 7, in which said last-defined means includes means locking said shiftable member in disengaged position when said reciprocating means is fully retracted.

9. Gear-shifting mechanism, comprising, in combination, a frame, a plurality of meshing gear means on a plurality of spaced parallel axes in said frame, said gear means including two shiftable members, each of which is separately connected to a gear means on a different axis and determines first, second and third engaged speed relations for the two axes with which it is concerned and for three different axial positions thereof, two rocker arms pivotally mounted intermediate actuation ends thereof, each said arm being adapted to shift a different one of said members upon rotation thereof, an indexible head carried by said frame for indexing movement and supporting for each indexed position thereof a separate pair of actuating pins for each of said arms, and means for advancing said pins into engagement with the ends of said arm when in a selected indexed position of said head, said last-defined means including means for retaining said head in advanced position, whereby a selected speed relation between said axes may be positively retained.

10. Mechanism according to claim 8, in which said last-defined means includes locating means identifying each possible indexed position of said head and dogging said head against arm-actuating advancement for positions other than said indexed positions.

11. Gear-shifting mechanism, comprising, in combination, frame means, a plurality of meshing gear means on a plurality of spaced parallel axes in said frame, said gear means including two shiftable members each of which is separately connected to a gear means on a different axis and determines first, second and third engaged speed relations for the two axes with which it is concerned and for three different axial positions thereof, two rocker arms each pivotally mounted intermediate actuation ends thereof and adapted to shift a different one of said members upon rotation thereof, a rotatably indexible head carried by said frame for indexing movement and supporting for each indexed position thereof a separate pair of actuating pins for each of said arms, means for advancing said head and therefore said pins into engagement with the ends of said arms when in a selected indexed position of said head, the actuating pins for one of said rocker arms being on a first circle about the index axis, and the actuating pins for the other of said arms being on a second and concentric circle about the index axis, and angular locating means effective only for each of the possible indexed positions of said head and coacting between said head and said frame means when said pins are advanced into engagement with said arms.

12. Gear-shifting mechanism, comprising, in combination, a plurality of meshing gears on a plurality of spaced parallel axes, said gears including two shiftable members each of which determines first, second and third engaged speed relations for the two axes with which it is concerned and for three different axial positions thereof, two rocker arms each adapted to shift a different one of said members upon rotation thereof, an indexible head supporting for each indexed position thereof a separate pair of actuating pins for each of said arms, and means for advancing said pins into engagement with the ends of said arm when in a selected indexed position of said head, said last-defined means comprising cam and follower members, one of which is rotatable about the index axis, and the other of which is fixed against rotation.

13. Gear-shifting mechanism, comprising, in combination, a frame, a plurality of meshing gear means on a plurality of spaced parallel axes in said frame, said gear means including two shiftable members, one of said members being connected to the gear means on one of said axes and determining first, second and third engaged speed relations for the two axes with which it is concerned and for three different axial positions thereof, the other of said members being connected to the gear means on another of said axes and determining first and second engaged speed relations for the two axes with which it is concerned and for two different axial positions thereof, said other member having a third axial position for which said last-mentioned two axes are disengaged, two rocker arms pivotally mounted intermediate actuation ends thereof, each said arm being adapted to shift a different one of said members upon rotation thereof, an indexible head carried by said frame for indexing movement and supporting for all of a plurality of indexed position thereof a separate pair of actuating pins for each of said arms, reciprocable means for advancing said head and therefore said pins into engagement with the ends of said arm when in a selected indexed position of said head, means operative upon retraction of said reciprocable means for moving said other member to said third axial position thereof, and indicator means including a dial on the index axis for displaying the selected indexed position of said indexible head.

14. Gear-shifting mechanism, comprising, in combination, a frame, a plurality of meshing gear means on a plurality of spaced parallel axes in said frame, said gear means including two shiftable members, one of which is connected to the gear means on one of said axes and determines engaged speed relations for the two axes with which it is concerned and for different axial positions thereof, the other shiftable member being connected to the gear means on another of said axes and determining an engaged speed relation and a disengaged relation for the two axes with which it is concerned and for different axial positions thereof, rocker arms pivotally mounted intermediate actuation ends thereof and respectively connected in axial displacement relation with said members, an axially shiftable indexible head carried by said frame for indexing movement and supporting for all of a plurality of indexed positions thereof a pair of actuating pins for each of said arms, means for advancing said head and therefore said pins to shift said arms and coacting members into engaged relation as defined by an indexed position of said head, and an operative connection between said head and said other shiftable member, said other shiftable member being axially displaceable to disengaged relation upon retraction of said head.

15. Mechanism according to claim 14, including means for locking said other shiftable member in disengaged relation upon full retraction of said head, thereby freeing one of said axes for manual rotation.

16. Mechanism according to claim 14, including means coacting with said head and with the rocker arm of each of said shiftable members to shift and lock said head in disengaged relation upon retraction of said head.

17. Mechanism according to claim 14, including means for rocking the arms of said other shiftable member after disengagement of their respective shifting pins when said head is retracted to shift said members in disengaged relation, and for locking said members in said relation upon full retraction of said head.

References Cited in the file of this patent

UNITED STATES PATENTS

| | | |
|---|---|---|
| 2,106,731 | Gallimore | Feb. 1, 1938 |
| 2,429,160 | Helmstein et al. | Oct. 14, 1947 |
| 2,515,710 | Holmes | July 18, 1950 |
| 2,873,613 | Schulte et al. | Feb. 17, 1959 |